(12) United States Patent
Koser

(10) Patent No.: US 8,337,578 B2
(45) Date of Patent: Dec. 25, 2012

(54) AIR FILTER DEVICE

(75) Inventor: Gerhard Koser, Uhingen (DE)

(73) Assignee: Mahle Interntaional GmbH (DE)

( * ) Notice: Subject to any disclaimer, the term of this patent is extended or adjusted under 35 U.S.C. 154(b) by 388 days.

(21) Appl. No.: 12/686,118

(22) Filed: Jan. 12, 2010

(65) Prior Publication Data

US 2010/0180856 A1 Jul. 22, 2010

(30) Foreign Application Priority Data

Jan. 16, 2009 (DE) .......................... 10 2009 004 909

(51) Int. Cl.
*B01D 50/00* (2006.01)

(52) U.S. Cl. ............. 55/385.3; 55/331; 55/332; 55/475; 96/149; 96/137; 96/139; 96/152

(58) Field of Classification Search ............ 55/331–332, 55/385.3, 475; 96/149, 137, 139, 152; 123/198 E
See application file for complete search history.

(56) References Cited

U.S. PATENT DOCUMENTS

| | | |
|---|---|---|
| 2,273,779 A | 2/1942 | Dickey et al. |
| 5,106,397 A | 4/1992 | Jaroszczyk et al. |
| 2007/0289268 A1* | 12/2007 | Smith ........................ 55/385.3 |
| 2009/0002182 A1* | 1/2009 | Knox et al. .................... 340/628 |
| 2009/0188220 A1 | 7/2009 | Freisinger et al. |

FOREIGN PATENT DOCUMENTS

| | | |
|---|---|---|
| DE | 272384 C | 3/1914 |
| DE | 7924103 U1 | 12/1986 |
| DE | 29613098 U1 | 9/1996 |
| EP | 2027908 A1 | 2/2009 |
| WO | WO-2005/082490 A1 | 9/2005 |
| WO | WO-2007/095675 A1 | 8/2007 |

OTHER PUBLICATIONS

European Search Report for EP09177324.

* cited by examiner

*Primary Examiner* — Jason M Greene
*Assistant Examiner* — Karla Hawkins
(74) *Attorney, Agent, or Firm* — Rader, Fishman & Grauer PLLC

(57) ABSTRACT

The invention relates to an air filter device (1) having a filter housing comprising a filter housing cup (2) and a filter housing cover, in which filter housing at least one filter element (3) is arranged. Pertinent to the invention is that a flow-directing element (7) is provided that is configured in such a manner that it is ensured that the filter element (3) is flowed through uniformly.

15 Claims, 1 Drawing Sheet

AIR FILTER DEVICE

CROSS-REFERENCES TO RELATED APPLICATIONS

This application claims priority to German patent application DE 10 2009 004 909.6 filed on Jan. 16, 2009, which is hereby incorporated by reference in its entirety.

TECHNICAL FIELD

The present invention relates to an air filter device having a filter housing which has a filter housing cup and a filter housing cover and in which at least one filter element is arranged according to the preamble of claim 1.

BACKGROUND

An air filter device of the type in question is disclosed in document WO 2005/082490 A1, for example.

Today, such known air filter devices are also increasingly used in modern automotive engineering in order both to qualitatively improve a fresh-air supply to a passenger compartment as well as to prevent an uncontrolled discharge of fuel vapours, for example in a tank ventilation region, into the environment. For this reason, such air filter devices customarily comprise a filter element that contains activated carbon, that is to say a hydrocarbon absorber. The activated carbon is arranged either packed in the filter housing of the air filter device as a bulk material or in a different manner and, in order to achieve the highest possible degree of filtration, is intended to be flowed through in as uniform a manner as possible. However, owing to so-called dead areas that that can be flowed through only minimally, if at all, this uniformity is not always possible.

SUMMARY

The present invention addresses the problem of providing for an air filter device of the type in question an improved or at least an alternative embodiment that is characterised in particular by improved filtration.

This problem is solved according to the invention by the subject matter of the independent claim 1. Advantageous embodiments are the subject matter of the dependent claims.

The present invention is based on the general concept of arranging a flow-directing element as well as an intermediate floor in an air filter device in the region of an air inlet, both elements together forcing a preferably homogeneous flow through a filter element arranged in the air filter device, thereby obviating so-called "dead areas" and achieving a very high degree of filtration. For this purpose, the air filter device according to the invention comprises a filter housing cup and a filter housing cover, the air inlet being centrally arranged on a floor of the filter housing cup. An air-permeable intermediate floor is arranged above the floor and is centrally supported on the air inlet protruding into the filter housing cup in a dome-like manner and is furthermore radially, exteriorly supported on a wall of the filter housing cup. The flow-directing element is provided in the region of the connection of the intermediate floor to the air inlet and is configured in such a manner that the air-permeable intermediate floor is uniformly impinged upon from below with inflowing air, which can force a uniformity of flow through the filter element. The flow-directing element disperses the air flow, which is flowing through the air inlet in the axial direction of the air filter device and also contains hydrocarbons, in the radial direction into the annular space arranged between the floor of the filter housing cup and the intermediate floor, thereby making homogeneous pressure possible in this annular space, which pressure can be relieved by uniformly flowing through the filter element arranged thereabove. So that so-called dead areas can be obviated to the greatest extent possible in the air filter device according to the invention, the air filter device according to the invention exhibits a particularly high degree of efficiency as well as a high degree of filtration performance.

In an advantageous development of the solution according to the invention, the flow-directing element is in the shape of a pyramid, a cone, a conical point, or a diamond having a plurality of facets pointing in the direction of the air inlet. The orientation of the pyramid or of the cone or of the diamond is downward, that is to say selected to be in the direction of the air inlet, thereby making it possible for the air flowing into the air filter device according to the invention from this direction to be distributed uniformly by the flow-directing element into the annular space positioned between the floor of the filter housing cup and the intermediate floor. Both the intermediate floor as well as the flow-directing element can be configured of plastic, which permits even difficult, that is to say complex, shapes to be simply realised. It is also conceivable that the flow-directing element is connected to the inlet protruding into the filter housing cup in a dome-like manner and is furthermore configured in particular as integral therewith, while the intermediate floor is manufactured as a separate insert and installed at a later time.

Additional important features and advantages of the invention can be found in the dependent claims, in the drawing, and in the pertinent description of the figures with reference to the drawing.

It is understood that the features described above and those to be described in what follows can be used not only in the particular cited combination, but also in other combinations or independently without departing from the scope of the present invention.

BRIEF DESCRIPTION OF THE DRAWING

A preferred embodiment of the invention is shown in the drawing and is described in more detail in the following description.

It is schematically shown in

DETAILED DESCRIPTION

Figure 1:
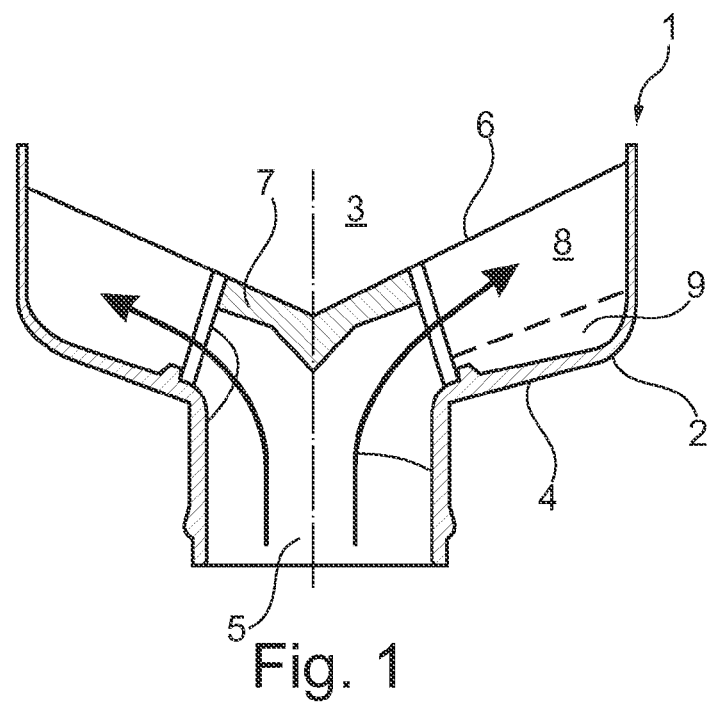
FIG. 1 a sectional view through an air filter device according to the invention, FIG. 2 a view from above of an opened air filter device.

Corresponding to FIG. 1, an air filter device 1 according to the invention has a filter housing cup 2 that is closed from above with a filter housing cover that is not shown. A filter element 3 is arranged within the filter housing cup, said filter element conventionally containing activated carbon and serving to absorb hydrocarbons. Accordingly, the air filter device 1 according to the invention is arranged, for example, in the region of a tank ventilation or ventilation device for a passenger compartment in a motor vehicle. An air inlet 5 is arranged centrally on the floor 4 of the filter housing cup 2, above which air inlet an air-permeable intermediate floor 6 is provided that can be configured conically or horizontally, for example. The intermediate floor is centrally supported on the air inlet 5 protruding into the filter housing cup 2 in a dome-like manner and is furthermore radially, exteriorly supported on a wall of the filter housing cup 2. A flow-directing element 7 is provided in the region of the connection of the intermediate floor 6 to the air inlet 5 and is configured in such a manner that the air-permeable intermediate floor 6 is uniformly impinged upon from below with inflowing air in such a manner that a uniform flowing through of the filter element 3 thereabove can be effected. That the filter element 3 be uniformly flowed through is required particularly for a high degree of filtration of the air filter device 1.

As can additionally be seen in FIG. 1, the intermediate floor is conically configured, while the flow-directing element 7 has the form of a diamond pointing in the direction of the air inlet 5. The individual facets of the diamond-like flow-directing element 7 ensure the uniform dispersal of the air current flowing through the air inlet 5 into an annular space 8 positioned between the intermediate floor 6 and the floor 4. The flow-directing element 7 makes possible a nearly homogeneous pressure distribution in the annular space 8 to the extent that the entire surface of filter element 3 is uniformly impinged upon from below with air charged with hydrocarbons. The above-mentioned listing already shows that the flow-directing element 7 can have different shapes, the individual types of the flow-directing elements 7 each being configured in such a manner that a uniform introduction of air into the annular space 8 can be ensured.

Figure 2:
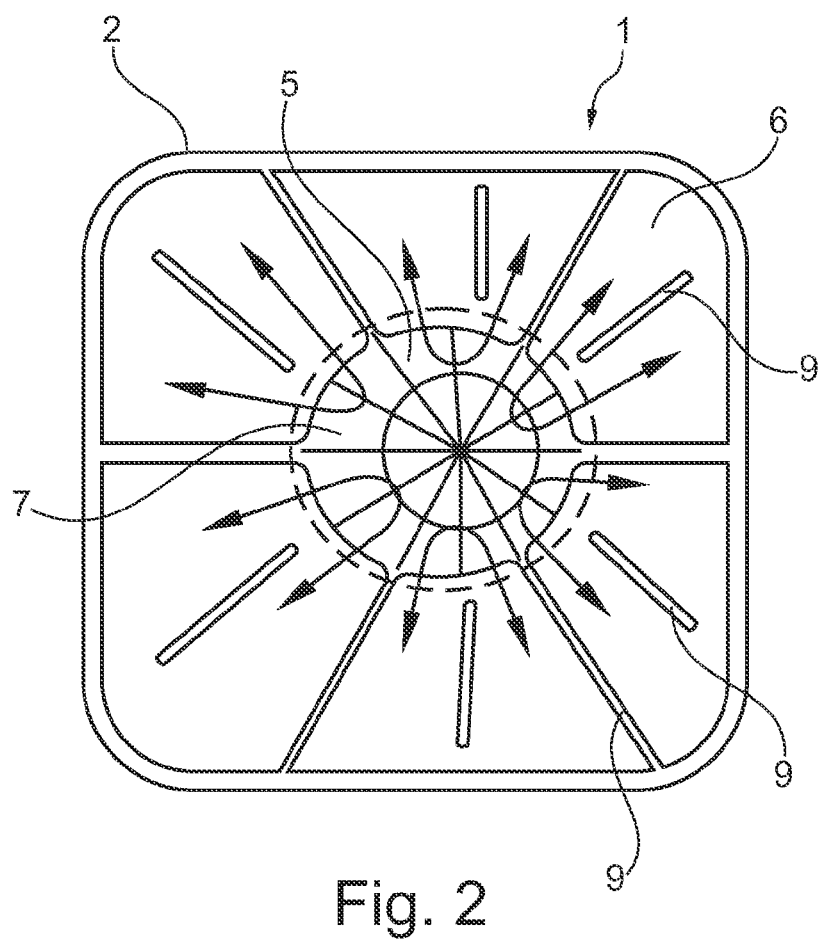

Air-directing elements 9, which can customarily extend in the radial direction but need not necessarily do so, can additionally be arranged (cf. FIG. 2) in the annular space 8 bordered by the intermediate floor 6 on the one side and the floor 4 on the other. The air-directing elements 9 are preferably fastened to the floor 4 of the filter housing cup 2 or are configured as integral therewith. It is particularly advantageous in the air filter device 1 according to the invention that heretofore required sieve baskets as sensors are no longer required and therefore can be dispensed with. It is likewise greatly advantageous that with the air filter device 1 according to the invention, dead areas that were always previously present are prevented, thereby making an overall increase in filter performance possible.

The invention claimed is:

1. An air filter device comprising:
a filter housing, wherein the filter housing includes a filter housing cup and a filter housing cover, such that at least one filter element is housed in the filter housing, wherein
a central air inlet is configured on a floor of the filter housing cup,
an air-permeable intermediate floor is configured above the floor, said intermediate floor being centrally supported on the air inlet such that the intermediate floor protrudes into the filter housing cup in a dome-like manner and is radially, exteriorly supported on a wall of the filter housing cup; and
a flow-directing element is configured below the intermediate floor and adjacent the connection of the intermediate floor to the air inlet and is configured such that the intermediate floor is uniformly impinged upon from below with inflowing air such that air passes uniformly through substantially all of the intermediate floor and is ensured to flow uniformly through the filter element.

2. The air filter device as specified in claim 1, wherein the intermediate floor is conically configured.

3. The air filter device as specified in claim 1, wherein the flow-directing element is in the shape of at least one of: a pyramid, a cone, and a diamond; and
wherein the tip of the flow-directing element is pointing in the direction of the air inlet.

4. The air filter device as specified in claim 1, wherein a plurality of air-directing elements are arranged in the annular space bordered by the intermediate floor and the floor.

5. The air filter device as specified in claim 4, wherein the air-directing elements extend in a radial direction outward from the air inlet.

6. The air filter device as specified in claim 4, wherein the air-directing elements are fastened to the floor of the filter housing cup, such that the elements are configured as integral therewith.

7. The air filter device as specified in claim 2, wherein the flow-directing element is in the shape of at least one of: a pyramid, a cone, and a diamond; and
wherein the tip of the flow-directing element is pointing in the direction of the air inlet.

8. The air filter device as specified in claim 2, wherein a plurality of air-directing elements are arranged in the annular space bordered by the intermediate floor and the floor.

9. The air filter device as specified in claim 3, wherein a plurality of air-directing elements are arranged in the annular space bordered by the intermediate floor and the floor.

10. The air filter device as specified in claim 5, wherein the air-directing elements are fastened to the floor of the filter housing cup, such that the elements are configured as integral therewith.

11. The air filter device as specified in claim 1, wherein the filter element comprises activated charcoal.

12. The air filter device as specified in claim 11, wherein the filter element is packed as a bulk material in the filter housing on the intermediate floor.

13. The air filter device as specified in claim 1, wherein the air filter device is disposed in a motor vehicle and is configured to perform tank ventilation of a fuel tank of the motor vehicle.

14. The air filter device as specified in claim 1, wherein the air filter device is disposed in a motor vehicle and is configured to filter air entering a passenger compartment of the motor vehicle.

15. An air filter device in at least one of a tank ventilation and a passenger compartment in a motor vehicle comprising,
a filter housing, wherein the filter housing includes a filter housing cup and a filter housing cover, such that at least one filter element is housed in the filter housing, wherein the filter element contains activated carbon, wherein a central air inlet is configured on a floor of the filter housing cup, and an air-permeable intermediate floor is configured above the floor, said intermediate floor being centrally supported on the air inlet such that the intermediate floor protrudes into the filter housing cup in a dome-like manner and is radially, exteriorly supported on a wall of the filter housing cup, and a flow-directing element is configured adjacent the connection of the intermediate floor to the air inlet and is configured such that the air-permeable intermediate floor is uniformly impinged upon from below with inflowing air such that air is ensured to flow uniformly through the filter element.

* * * * *